United States Patent [19]

Arnieri

[11] 4,038,835
[45] Aug. 2, 1977

[54] AIR CONDITIONING FOR AUTOMOBILES

[76] Inventor: Charles Arnieri, 2216 N. Nordica St., Chicago, Ill. 60635

[21] Appl. No.: 664,032

[22] Filed: Mar. 4, 1976

[51] Int. Cl.² .......................... B60H 3/04; B60H 3/00
[52] U.S. Cl. ........................................ 62/244; 98/2.11
[58] Field of Search ............................ 62/244; 98/2.11

[56] References Cited

U.S. PATENT DOCUMENTS

| 2,053,206 | 9/1936 | Sargent | 62/244 |
| 2,620,636 | 12/1952 | Stanton | 62/244 |
| 2,731,104 | 1/1956 | Baker et al. | 98/2.11 |
| 2,796,014 | 6/1957 | Montgomery et al. | 98/2.11 |
| 2,970,456 | 2/1961 | Rice | 98/2.11 |
| 3,211,076 | 10/1965 | Chancellor et al. | 98/2.11 |
| 3,595,029 | 7/1971 | Lende, Jr. | 62/244 |

*Primary Examiner*—Lloyd L. King
*Attorney, Agent, or Firm*—Paul H. Gallagher

[57] ABSTRACT

An air conditioning apparatus and system for an automobile having the operating unit in the trunk, including cool air tubes leading up to and opening through the back shelf behind the back seat, to the interior. The air is taken in from the exterior through the floor of the trunk and driven over the cooling element, and the hot air from the unit is exhausted out to the exterior. A drain tube lets the condensed ambient vapor drain from the unit to the exterior. The main operating unit can be placed in a relatively small space, such as on the ledge at the front of the trunk. None of the parts are in the front under the hood, except the beginnings of the electric lines leading from the alternator.

5 Claims, 12 Drawing Figures

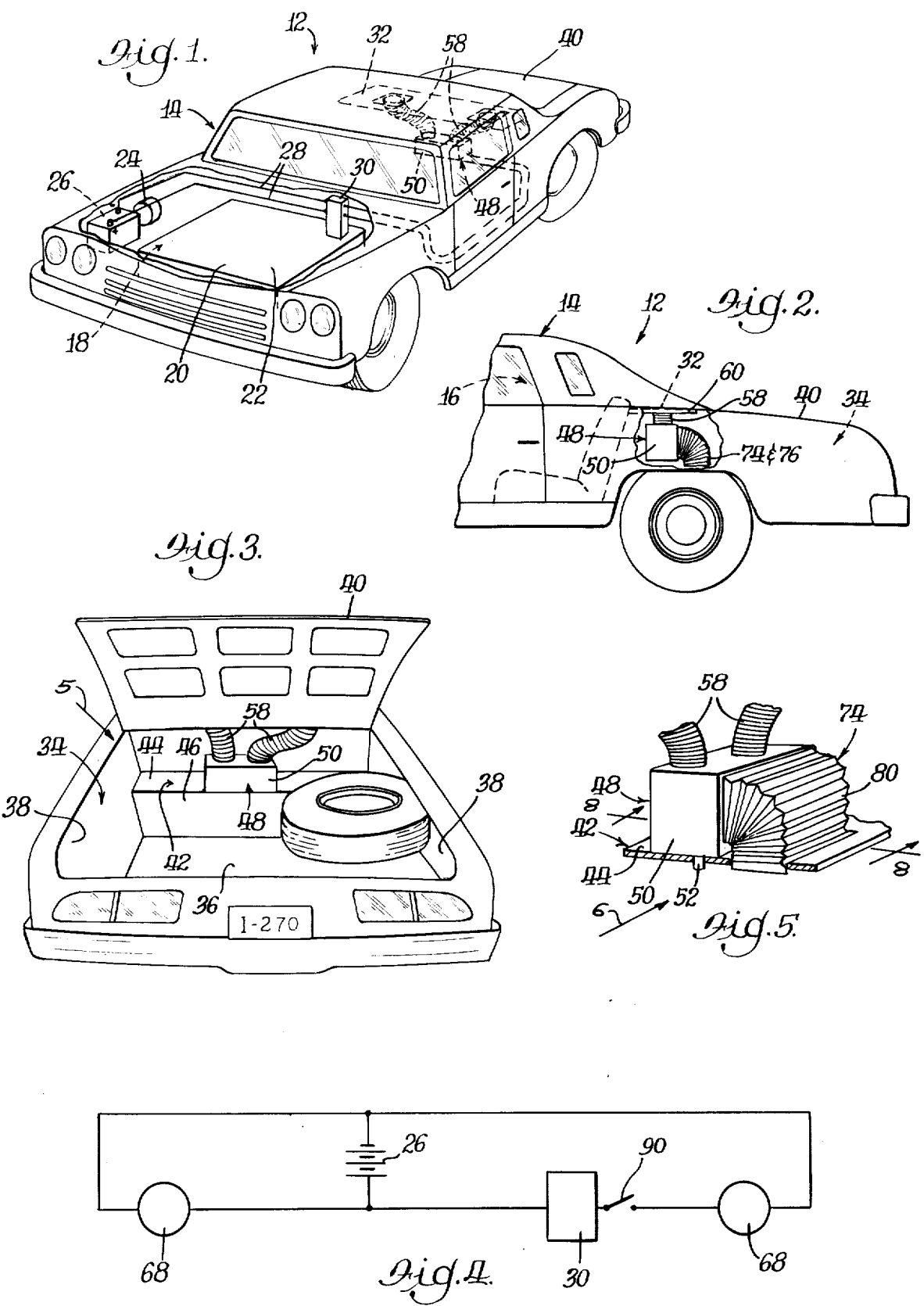

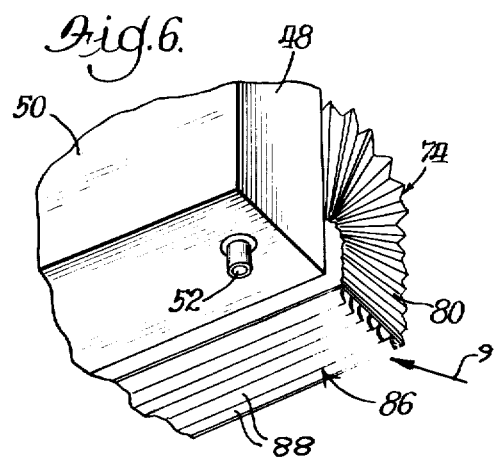
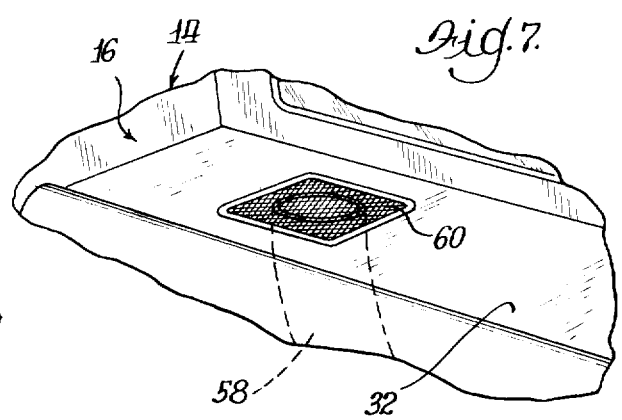
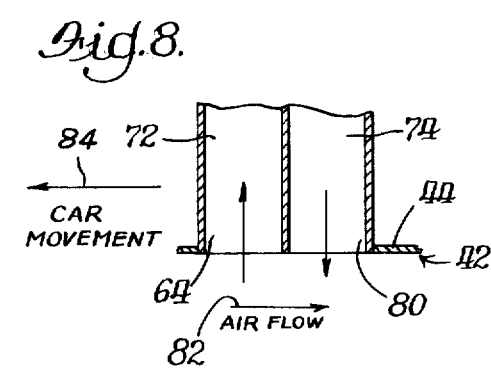
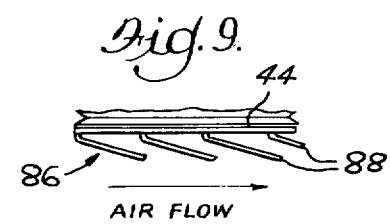
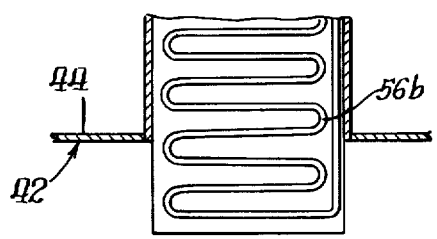
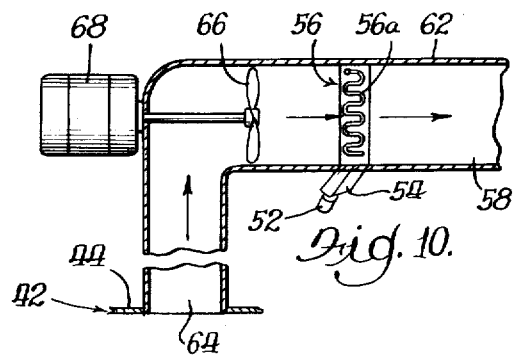
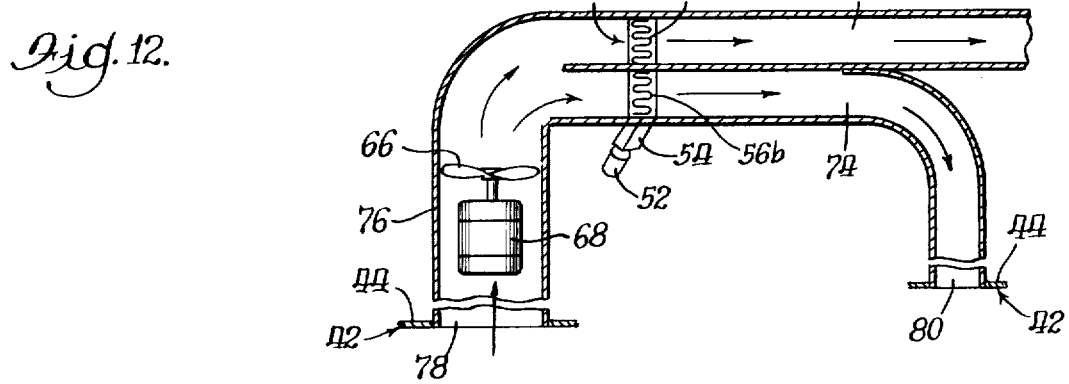

AIR CONDITIONING FOR AUTOMOBILES

OBJECTS OF THE INVENTION

A broad object of the invention is to provide a novel air conditioning apparatus or system for an automobile having substantially the entire apparatus located in the trunk of the automobile, to the exclusion of the location of any part of it under the hood, thereby leaving the engine and the appurtenances thereof readily accessible without obstruction or interference from the air conditioning apparatus.

Another broad object of the invention is to provide air conditioning apparatus for an automobile of the general character referred to above having various components and parts so shaped and proportioned and placed in the trunk of the automobile in a position thereof that is ordinarily difficult to reach, whereby notwithstanding the presence of the apparatus, the trunk is highly efficient from the standpoint of storage of articles to be hauled.

Still another broad objectis to provide air conditioning apparatus for an automobile which does not require power from the engine, whereby to render the apparatus more efficient and effective and to leave the power plant free for maximum utility and efficiency for driving the automobile and other related functions.

Another object is to provide an air conditioning apparatus for an automobile wherein the main operating unit is placed in the trunk of the automobile, and which includes a novel arrangement for air intake for the cooling function.

Another object is to provide an air conditioning apparatus of the kind referred to just immediately above and which includes a novel arrangement for exhausting the heated air from the condensing element thereof to the exterior.

An additional object is to provide air conditioning apparatus for an automobile having a novel arrangement for driving or impelling air through the operating unit, both cool air and heated air, for their respective functions.

Still another object is to provide air conditioning apparatus for an automobile having the main operating unit in the trunk of the automobile including a novel arrangement of air ducts leading from the operating unit into the interior of the automobile, through the back shelf usually provided in rear of the back seat, whereby to most efficiently utilize the space in the trunk in addition to placement of the air ducts, to provide efficiently arranged space for packing and storing of articles.

An additional object is to provide air conditioning apparatus for an automobile well adapted for operation alternatively by different components of the power plant, e.g., the battery or the alternator, which are usually provided in the power plant.

Still another object is to provide a novel method of cooling automobiles.

DESCRIPTION OF A PREFERRED EMBODIMENT:

In the drawings:

FIG. 1 is a perspective view of an automobile, and the air conditioning apparatus in dotted lines, including electric lines leading from the battery which is under the hood, to the main operating unit which is located in the trunk;

FIG. 2 is a side view of the rear part of an automobile, partially broken away, and showing the main operating unit of the air conditioning apparatus in the trunk;

FIG. 3 is a perspective view of the rear end of an automobile showing the trunk open, and the main operating unit of the air conditioning apparatus in the trunk;

FIG. 4 is a diagram showing the electric circuit utilized for the apparatus;

FIG. 5 is a perspective view of the main operating unit of the apparatus, taken approximtely in the direction of the arrows in FIG. 3, and the floor element on which it is mounted;

FIG. 6 is a perspective view of the under side of the unit of FIG. 5 as indicated by the arrow 6 in the latter figure;

FIG. 7 is a perspective view of an outlet grille in the interior of the automobile indicating a cool air line from the main operating unit;

FIG. 8 is a sectional view taken at line 8—8 of FIG. 5;

FIG. 9 is a detail view taken at arrow 8 in FIG. 6;

FIG. 10 is a diagrammatic view showing the manner of impelling air through a cool air tube;

FIG. 11 is a view similar to FIG. 10 showing an alternative arrangement for handling both cool air and heated air; and FIG. 12 is a detail view showing the coil having a portion exposed to the exterior.

Referring in detail to the drawings, attention is directed first to FIGS. 1-3 showing a conventional automobile or car 12 having a body 14 defining an interior space 16 for passengers. The automobile also includes a front end portion or space 18 covered by the usual hood 20. Located in the space 18 is an engine 22 forming a power plant, and driven by the engine is an alternator 24 for charging a battery 26. Electric lines 28 lead from the battery and preferably included in the circuit is a convertor 30. This self-contained air conditioner apparatus or system could be made in many shapes or forms. It could be operated on 12 volts D.C. or with an inverter that converts 12 V D.C. to 120 A.C., and does not require any power from the motor, but only from the alternator and the battery.

Most often the body of the automobile is so shaped and built as to provide a back shalf 32 (see also FIG. 7) rearwardly of the back seat and the design and arrangement of the parts of the device are such that the cool air lines lead from the main operating unit in the trunk through the back shelf and to the interior space of the automobile.

Attention is directed next particularly to FIGS. 2 and 3 where the automobile is shown with the trunk 34 forming a storage space at the rear end. The trunk is defined by various body structural elements including a floor element 36, side walls 38 and is normally closed by a lid 40 shown in open position in FIG. 3. Usually formed in the trunk is a ledge or shelf 42 defined by a top or floor element 44 and a rear vertical wall element 46. This ledge is not essential to the arrangement or operation of the device of the present invention, but the location of the main operating unit of the device on this ledge indicates the adaptability of the device to trunks of various proportions and having portions extending in different directions. Openings through the element 44 of the ledge 42 lead to the exterior of the body, and the air intake and exhaust lines are conveniently formed through that floor element.

The main operating unit of the air conditioning apparatus is indicated in its entirely at 48. This unit is conventional in the sense that it includes all of the essentials for air conditioning, that is, a coil having a fluid for expansion and condensing, a compressor for condensing the gas to a liquid, common means for blowing the air over the coil for cooling it, and driving it into the interior of the automobile, means for blowing air over the condenser to the exterior for dissipating the heat, and a drain tube. These parts or components need not be described in detail since they are all conventional in the general operation of an air cooling unit, but portions of the elements or parts will be referred to hereinbelow, and particularly their relation to other elements of the complete apparatus in the incorporation of the apparatus in the automobile.

Incorporated in the unit 48 is a chest or box 50 enclosing the main operating components of the operating unit. This chest is mounted on the ledge 42 and thus the unit is disposed in a portion of the trunk space in which it is farthest from reach and thus occupying the least usable space of the trunk, the space above the ledge being of course smaller than the main space rearwardly thereof. The chest or box is secured to the floor element of the ledge in any suitable manner and FIG. 5 shows a drain pipe 52 leading down from the chest through an opening in the floor element to the exterior of the car. The drain pipe 52 leads from a trough or catcher 54 (FIG. 10) located under the coil 56 of the unit, an element 56a thereof being shown explicitly, and other portions of the coil will be shown and referred to in other figures.

Leading from the chest 50 are cool air ducts or tubes 58, preferably two in number which lead to the back shelf 32 (FIGS. 2, 7) and open therethrough into the interior of the automobile where they are covered by suitable screens or grilles 60. One such tube may be sufficient, but two are preferred, and opening through the back shelf at the ends of the latter.

The ducts or tubes 58 are preferably or corrugated hose of known kind and of suitable diameter to provide capacity to carry the volume of cool air needed. They are flexible and stretchable so that they can be positioned and extended to various locations. The tubes 58 lead from one or more conduits or pipes 62 (FIG. 10) within the chest 50, which include an element 56a of the coil 56. The air is drawn in from the exterior at 64 through an opening through the floor element 44 in the ledge or shelf 42. The air is conducted into the conduit by fan or blower 66 driven by a motor 68 (see also FIG. 4), the fan then blowing the air over the cooling coil element 56a and through the tubes or hose 58 into the interior of the car.

FIG. 10 shows the trough element 54 referred to above, which is disposed under the coil element 56a, the vapor condensing on this coil element and the resulting water drops off into the trough and through the drainage pipe 52.

FIG. 11 shows one arrangement for dissipating the heat from the unit 48. In this figure duct means 70 is provided which includes a cool air duct 72 and an exhaust duct 74. The coil 56 is shown which includes the cooling coil element 56a referred to above, in the cool air duct 72, and a condenser coil element 56b in the exhaust duct 74. The two ducts 72, 74 lead from a common duct 76 having an inlet opening 78 through the floor element 44 of the ledge 42, thus drawing in air from the exterior, below. The fan 66 and the driving motor 68 are also shown here. Leading from the outlet of the duct 72 are the cool air ducts or tubes 58, and the exhaust duct 74 terminates in an outlet 80. The outlet duct 74 also should be corrugated and stretchable (FIGS. 2, 5 and 6) to enable it to be placed at selective locations.

It is also within the scope of the invention that the condenser element 56b of the coil be merely placed in an exterior draft, as shown in FIG. 12, such as below the floor element 44, and subject to the flow of air past the automobile as the latter is moving, that is, without the necessity for a separate exhaust fan 66.

FIG. 8 shows a detail of the construction of the inlet and outlet passages. For example, both 64, 80 could be in a single construction but in this case they would be placed side-by-side, or the intake would be placed ahead of the exhaust duct relative to the movement of the car, so that the movement of air as indicated by the arrow 82, caused by the opposite movement of the car as indicated by the arrow 84, provides fresh air in the intake duct and that no exhaust air leaving the exhaust duct enters the intake duct. Thus the intake duct can be located nearly anywhere except rearwardly of the exhaust duct.

FIG. 9 shows a form of grillework or baffle that may be utilized on the open ends of the ducts which open downwardly through the floor element 44 of the ledge. The floor element as indicated at 44 and the grillework at 86; the grillework is a metal sheet with transverse louvers 88 stamped from the section in FIG. 9. The total opening through the grille is substantial, sufficient to enable free flow of air therethrough, but the louvers extend horizontally over the projection of these openings, and they may be drawn in that direction to overcome the foreshortening due to their angular position, and as so positioned prevent any splashing of slush or rain upwardly, under the automobile, into the air ducts.

FIG. 4 shows the electric circuit utilized in the air conditioning apparatus and includes the alternator 24, the battery 26, the convertor 30, and the motor 68. A manually actuated normally open switch 90 is also provided in the circuit.

The arrangement shown and described above, of the air conditioning apparatus has the distinct advantage that all the operating parts are located in the trunk, with no parts in the front under the hood. One advantage of this is that the front end space under the hood, or engine space, is left entirely to the engine itself and the directly pertinent parts, simplifying the arrangement in that space, and rendering it more convenient to gain access to the engine. A more important advantage is that the air conditioning apparatus is located entirely in the trunk and made more efficient thereby. The main operating unit, or cooling unit, may be placed at any desired location according to the design of the trunk space, and usually that part of the space at the extreme forward end is less accessible to the user for packing things to be hauled, and accordingly a minimum of usable space in the trunk is occupied by the air conditioning apparatus. Additionally the operating unit is closely adjacent the back shelf of the interior of the car and the cool air tubes need reach only a short distance from the main operating unit to that shelf and to the interior of the automobile. Still further the cool air tubes are flexible and can be shaped or positioned for reaching anywhere within a wide range, for their purpose.

A still further advantage is the overall efficiency and requirement for minimum of power. Also the power required for operating the unit is connected with the battery. It normally derives its power from the alternator as the engine is running, and thus there is normally no drain on the battery. However, if it should be desired to drive the unit directly from the battery, the convertor 30, of known type, is utilized for producing the necessary voltage for driving the unit.

A further advantage is in the method of cooling or air conditioning automobiles in that the apparatus is particularly adapted to designing and proportioning to fit and accommodate all automobiles and particularly the trunk spaces thereof, of any size and proportions, whereby a single basic apparatus can be well adapted to substantially any automobile on the market.

I claim:

1. Air conditioning apparatus for an automobile having a power plant which includes a battery, an alternator, and a converter; an interior passenger space with a back shelf in the interior space rearwardly of the back seat; and a rear trunk with surrounding side walls and a main floor element and a ledge at the front of the trunk elevated above the main floor element and itself forming a floor element, the air conditioning apparatus comprising,
a self-contained main operating unit mounted on the ledge in the trunk, and incorporating a coil including a cooling element and a heat dissipating element,
means forming an air inlet passage from the exterior through the floor element of the ledge and heading into the operating unit to the cooling element therein,
a flexible and extendible hose forming a cool air duct leading from the operating unit and communication with the interior space through the back shelf,
a flexible and extendible hose heading from the operating unit through the floor element on the ledge to the exterior and forming an exhaust duct leading from the heat dissipating element to the exterior,
means for receiving condensation from the cooling element in the operating unit and conveying it through the floor element on the ledge to the exterior,
means for drawing air from the exterior, forcing it over the cooling unit and through the air duct to the interior space of the automobile, and
means for driving air over the heat dissipating element and through the exhaust duct to the exterior.

2. Air conditioning apparatus according to claim 1 wherein,
the air inlet passage and exhaust duct have their openings to the exterior in close proximity to each other, with the air inlet passage relatively anterior, and the exhaust duct relatively posterior, with respect to the direction of movement of the automobile.

3. Air conditioning apparatus according to claim 1 and including,
common means for forcing air over the cooling element and the heat dissipating element.

4. Air conditioning apparatus according to claim 1 wherein,
said ducts open downwardly at the position where they communicate with the exterior, and are provided at such openings with a grille thereover which includes a large total open space and louvers extending angularly and transversely fully over the open space, whereby to substantially preclude entrance of slush and water upwardly due to action of the automobile in movement thereof.

5. Air conditioning apparatus for an automobile having a power plant which includes a battery, an alternator, and a converter; an interior passenger space with a back shelf in the interior space rearwardly of the back seat; and a rear trunk with surrounding side walls and a main floor element and a ledge at the front of the trunk elevated above the main floor element and itself forming a floor element, the air conditioning apparatus comprising,
a self-contained main operating unit mounted on the ledge in the trunk, and incorporating a coil including a cooling element and a heat dissipating element,
means forming an air inlet passage from the exterior through the floor element of the ledge and leading into the operating unit to the cooling element therein,
a flexible and extendable hose forming a cool air duct leading from the operating unit and communicating with the interior space through the back shelf,
means for receiving condensation from the cooling element in the operating unit and conveying it through the floor element on the ledge to the exterior,
means for drawing air from the exterior and forcing it over the cooling unit and through the cool air duct to the interior space of the automobile, and
the heat dissipating unit having a portion extending to the exterior for dissipation of heat therefrom directly by passage of the air therepast caused by movement of the automobile.

* * * * *